Feb. 24, 1931.                J. A. BOWDEN                1,793,583
AIR CLARIFYING MEANS
Filed Sept. 17, 1927
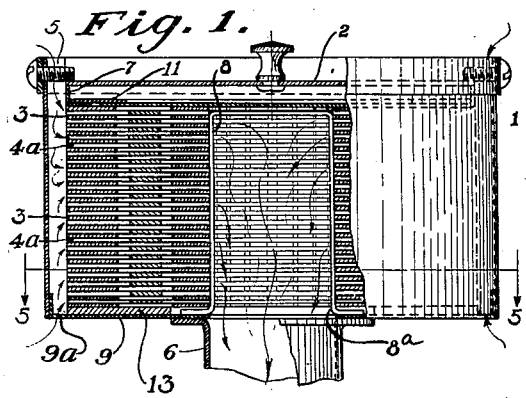
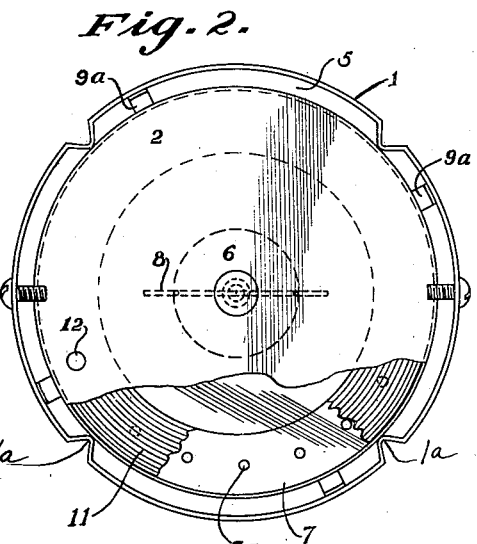
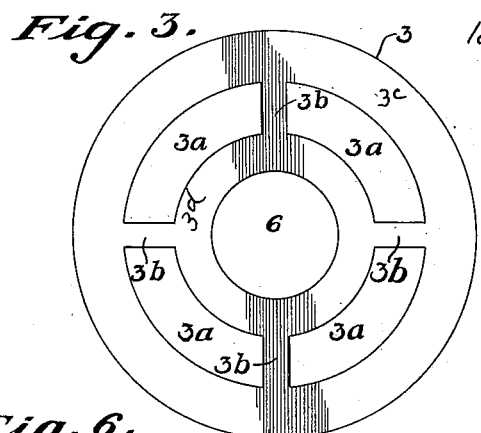
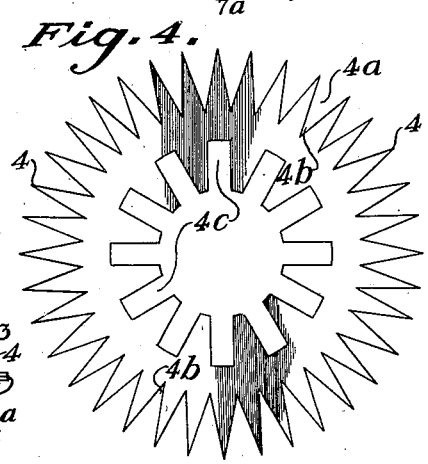
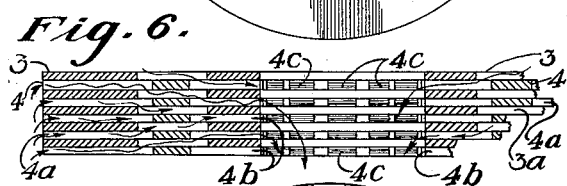
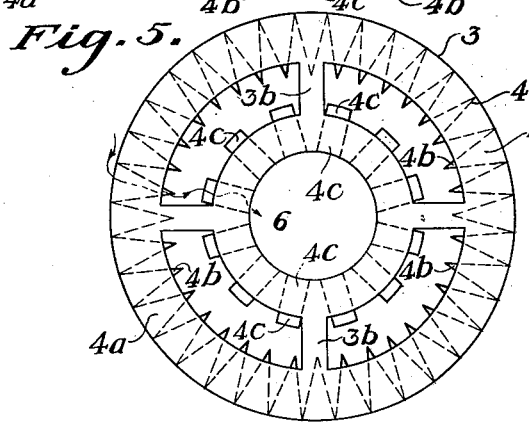
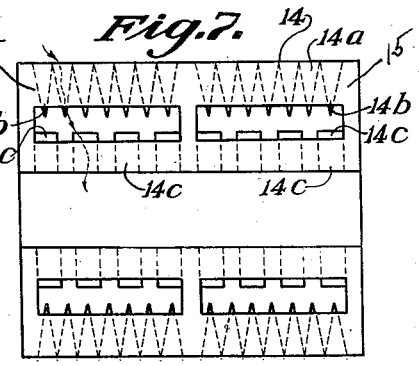
Inventor:
Junius A. Bowden Patented Feb. 24, 1931

1,793,583

UNITED STATES PATENT OFFICE

JUNIUS A. BOWDEN, OF LOS ANGELES, CALIFORNIA

AIR-CLARIFYING MEANS

Application filed September 17, 1927. Serial No. 220,225.

The object of my invention is to provide a combination of liquid treated absorption plates or members best adapted for removing the greatest amount of dust from air for a given space, the absorption plates may be made from paper board, wood fibre board or similar material, the dust being removed from air by adhesion and trapping being particularly well adapted for purifying air for the fuel mixture of automobiles.

Another object is to provide such construction and combination of absorption members that will provide a large number of small air passageways that will remain constant, in other words not settle by vibration or weight and cut down the necessary total air flow originally provided.

Another object is to provide such construction and combination of absorption members, for a given size, that will result in the greatest amount of exposed edge surface for the dust laden air to contact with.

A very important and novel feature of the invention consists in the formation of absorption plates or members of two different constructions made from sheet material, whereby when one form is placed face to face upon the other it will result in creating a large number of small indirect air passageways, resulting in pockets, the latter adapted to hold the dust.

Another object is to provide a guide and holder as one member, adapted for holding a completed stack of the members in alignment and for handling them as a unit, when assembling or when removing a used stack, for replacement with a new filling.

Further objects and advantages of the invention, will be found in the detail description and particularly pointed out in the appended claims.

Referring to the drawings, Figure 1 is a front elevation partially in section; Figure 2 is a plan view showing a cover, partially cut away to show other details; Figure 3 is an absorption plate or member; Figure 4 another absorption plate or member; Figure 5 is a plan view on line 5—5 of Figure 1; Figure 6 is an enlarged fragmental cross-section detail showing plates 3 and 4 assembled; Figure 7 is a modified form of absorption plates or members.

Referring to the numerals, in Fig. 1— 1 is the casing; 2 lid to casing; 3 one of the absorption plates; 5 air inlet; 6 air outlet; 7 oil pan; 8 holder and guide member combined; 8a extension foot of holder; 9 bottom of casing; 9a extension member connecting casing to bottom; 11 soft washer; 13 clearance ring.

In Fig. 2, reference numerals, as in all other figures, correspond to the same features, except modified forms. 1a guide rib; 12 oil hole; 7a perforation.

In Fig. 3,— 3 is an absorption plate or air cleaning member, which may be described as an outer and an inner ring or body, joined together with connecting links 3b; 3a is a cut-out portion; 6 outlet; in Fig. 4,— 4 absorption plate or air cleaning member which may be described as a plate having its outer edge portion formed similar to saw teeth and its inner portion having numerous slots leading into an outlet.

In Fig. 5— 3 absorption plate or air cleaning member; 4 absorption plate or air cleaning member. 4a air inlet, 4b pocket air outlet, 4c air outlet; 6 air outlet.

In Fig. 6 the enlarged cross-section segmental members 3 and 4 are more clearly illustrated than in Fig. 1.

Fig. 7,— 14 absorption plate or air cleaning member; 14a air inlet; 14b air outlet, 14c air outlet; 15 absorption plate.

To explain more fully the result from a combination of plates, 3 and 4, when they are placed flatly face to face together and their outer edges registering as shown in Fig. 5 (see also Fig. 6) an air passageway is formed at 4b and 4c. The incoming air enters at edges of the saw teeth 4a beneath plate 3 and out at the small openings 4b, then down through openings 4c and out into the main outlet 6. The air makes two right angle turns when passing from the exterior to the interior indicated by arrows, and in its course deposits dust by adhesion. A large part of the dust is trapped in the pocket like outlets 4b and also largely caught upon the edge surfaces wherever they appear; it being understood the plates are first saturated, preferably with oil, and the edge surfaces perform about 90% of the total work.

In further explanation of the deposition and retention of dust particles in the device it is to be understood that, by reason of the sinuous air passages with the right angled turns provided by the arrangement of the perforate plates as stated, the dust tends to deposit at these turns in the passageway.

With oil impregnated plates the deposition of dust particles in these passages tends to cause an extraction of the oil by capillary attraction and thus to retain the dust particles within the plates preventing its discharge to the outlet passage. By making these plates of inexpensive material and arranging them to be withdrawn as a unit by means of the yoke 8 a used stack of plates may be withdrawn and discarded and a new stack inserted in the outer supporting casing 1.

A very important advantage is gained by stacking the plates solidly face to face together when assembling a complete filling, since about double the number of plates may be installed in the same height casing, furthermore more liquid is stored as compared with the plan shown in my former application Serial No. 195,082.

With an increased number of plates to a given size casing, greater economy and efficiency results.

My novel plan of combining plates of different construction provides against the objectionable feature of the air passageways becoming reduced. The only reduction in the air passageways with my improved plan, is caused by the intended result of collecting dust.

A variation in the width of part 3c or 3d, in Fig. 3, may be made, to change the size of air passageways 4b and 4c (see Fig. 5) to regulate required amount of air.

A very important improvement results when building one form of plate face to face with the other, thus creating the narrow air passageways.

On a large scale for stationary work, water may be used, in this case the modified form would be used.

The yoke like holder 8 is important, inasmuch as it acts to hold the members in alignment and serves as means for handling a complete stack or filling comprising the cleaning elements, so they may be installed or removed from the casing as a unit; it should be understood this holder remains in the assembled filling and that the plates, as a unit, are removed and replaced with this holder when desired, it being the intention to replace the used cleaning elements by clean ones when necessary.

The oil pan 7 shown in Fig. 2 may be used to replenish oil to the plates. The perforation 7a allowing the oil to pass slowly to the plates, when covered with the soft washer 11.

A coarse wire screen tube may be used in the central outlet 6, as additional means to hold the plates in place.

What I claim is:

1. As an article of manufacture, air clarifying means comprising numerous absorption plates of two different forms used in combination, one of said forms having saw-like teeth formed at its outer edge and numerous slots formed at its inner edge, the other form of absorption plate having an outer body portion and an inner body portion, said portions being joined together integrally by links.

2. In an air clarifying device, a series of liquid impregnated perforate plates of two different forms, certain of the perforations in one form of said plates communicating with an outlet, the outlet lying inside the periphery of the plates arranged in a stack in alternate relation to each other and in surface contact with each other, the perforations of contiguous plates partially overlapping each other as to provide a plurality of air passages each extending between the periphery of the plates and said outlet, and each having a plurality of right angle turns tending to cause deposition of solid material carried by the air current through the passage.

3. In an air clarifying device, a series of perforate plates arranged in a stack in surface contact one with another with perforations of the adjacent plates in overlapping relation providing sinuous air passages, a supporting member for the plates maintaining them in assembled relation, said plates each having a central aperture providing, when the plates are stacked in an air outlet passage, an outlet conduit connected with said outlet passage at one end, a closure member for the opposite end thereof preventing ingress of air to the outlet passage except through the passageways provided by the plates, and a holder by means of which the stack of plates may be removed as a unit from the supporting means.

4. In an air clarifying device, a series of plates of absorption board of different forms, one of the forms having slots extending thereinto from its outer edge providing for an air inlet and another of the forms having a portion overlying the outer portion of the slots when the forms are arranged in surface contact in a stack, the plates further having a central aperture providing an outlet when the plates are assembled.

5. In an air clarifying device, a casing having an inlet and an outlet, a plurality of liquid impregnated perforate absorption plates stacked in said casing with the perforations of contiguous plates partially overlapping each other, certain of the perforations communicating with the inlet and others communicating with the outlet, providing a path for air which includes a plurality of turns between the inlet and outlet, and a liquid reservoir in said casing communicating with said stacked plates to replenish the liquid impregnating said plates.

6. In an air clarifying device, a casing having an inlet and an outlet, a plurality of liquid impregnated perforate absorption plates stacked in said casing with the perforations of contiguous plates partially overlapping each other, certain of the perforations communicating with the inlet and others communicating with the outlet, providing a path for air which includes a plurality of turns between the inlet and outlet, and a liquid reservoir above said stacked plates and communicating with them to replenish the liquid impregnating said plates.

In testimony whereof, I have hereunto set my hand at Los Angeles, California, this 12th day of September, 1927.

JUNIUS A. BOWDEN.